United States Patent
Aitken et al.

(10) Patent No.: US 11,661,924 B2
(45) Date of Patent: *May 30, 2023

(54) ROTOR LOCK FOR WIND TURBINE

(71) Applicant: LiftWerx Holdings Inc., Cambridge (CA)

(72) Inventors: Glen D. Aitken, Fergus (CA); Hubert Boter, Utrecht (NL)

(73) Assignee: Liftwerx Holdings Inc., Cambridge (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/864,721

(22) Filed: Jul. 14, 2022

(65) Prior Publication Data
US 2022/0349388 A1    Nov. 3, 2022

Related U.S. Application Data

(63) Continuation of application No. 17/271,334, filed as application No. PCT/CA2019/051174 on Aug. 27, 2019, now Pat. No. 11,434,879.
(Continued)

(51) Int. Cl.
*F03D 80/50* (2016.01)
*F03D 80/80* (2016.01)
*F03D 7/02* (2006.01)

(52) U.S. Cl.
CPC .......... *F03D 80/50* (2016.05); *F03D 7/0268* (2013.01); *F03D 80/88* (2016.05); *F05B 2260/31* (2020.08); *F05B 2260/506* (2013.01)

(58) Field of Classification Search
CPC .......... F03D 80/50; F03D 80/88; F03D 7/026; F05B 2260/31; F05B 2260/506; F16D 63/006

See application file for complete search history.

(56) References Cited

U.S. PATENT DOCUMENTS 8,556,591 B2    10/2013    Koronkiewicz
9,476,396 B2 *  10/2016    Fritzsche ............ F02N 11/0866
(Continued)

FOREIGN PATENT DOCUMENTS

CN    102251936 A    11/2011
CN    202117860 U *  1/2012
(Continued)

OTHER PUBLICATIONS

European search report dated May 11, 2022 on European application 19853319.2.
(Continued)

*Primary Examiner* — Topaz L. Elliott
(74) *Attorney, Agent, or Firm* — Brunet & Co. Ltd.; Robert Brunet; Hans Koenig

(57) ABSTRACT

A lock for preventing rotation of a rotor of a wind turbine has a rotatable lock pin, a pin support supportable in a nacelle of the wind turbine and a mechanism for rotating the lock pin. The pin support has a hub-facing face proximate a rotor hub. The rotatable lock pin is rotatably mounted on the pin support. The lock pin has a cammed portion extending away from the hub-facing face toward the hub. The lock pin inserted into a complementary rotor lock aperture on the rotor hub when the pin support is supported in the nacelle. Rotation of the lock pin causes engagement of an exterior surface of the cammed portion with an interior surface of the rotor lock aperture to immobilize the lock pin against the interior surface to prevent relative motion between the lock pin and the aperture to prevent rotation of the rotor.

10 Claims, 18 Drawing Sheets

Related U.S. Application Data

(60) Provisional application No. 62/725,885, filed on Aug. 31, 2018.

(56) References Cited

U.S. PATENT DOCUMENTS

| | | | |
|---|---|---|---|
| 10,830,209 B2 * | 11/2020 | Larsen | F03D 7/0264 |
| 2014/0010656 A1 * | 1/2014 | Nies | F03D 7/0244 |
| | | | 29/889 |
| 2014/0090517 A1 * | 4/2014 | Suzuki | F16D 63/006 |
| | | | 74/814 |
| 2014/0322018 A1 * | 10/2014 | Fritzsche | H02J 1/08 |
| | | | 416/169 R |
| 2015/0260164 A1 | 9/2015 | Su | |
| 2019/0219034 A1 * | 7/2019 | Markussen | F03D 7/0268 |
| 2019/0277254 A1 | 9/2019 | Larsen | |
| 2020/0116125 A1 * | 4/2020 | Gudewer | F16H 1/32 |

FOREIGN PATENT DOCUMENTS

| | | | | |
|---|---|---|---|---|
| CN | 101535635 B * | 6/2012 | | F03D 1/003 |
| CN | 113294301 A * | 8/2021 | | F03D 1/003 |
| DK | 2620637 T3 * | 1/2017 | | |
| EP | 2381102 A2 | 10/2011 | | |
| KR | 20130062009 A | 6/2013 | | |
| WO | 2018036595 A1 | 3/2018 | | |
| WO | 2018065018 A1 | 4/2018 | | |

OTHER PUBLICATIONS

International Search Report and Written Opinion dated Oct. 25, 2019 on PCT/CA2019/051174.
Office action dated Apr. 4, 2022 on U.S. Appl. No. 17/271,334.

* cited by examiner

ROTOR LOCK FOR WIND TURBINE

CROSS-REFERENCE TO RELATED APPLICATIONS

This application is a continuation of U.S. Ser. No. 17/271,334 filed Feb. 25, 2021, which is a national entry of PCT/CA2019/051174 filed Aug. 27, 2019, which claims the benefit of United States Provisional Patent Application U.S. Ser. No. 62/725,885 filed Aug. 31, 2018, the entire contents of all of which are herein incorporated by reference.

FIELD

This application relates to wind turbines, in particular to a lock for preventing rotation of a rotor during maintenance of the wind turbine.

BACKGROUND

Replacement or repair of wind turbine components, in particular wind turbine components connected to a rotor of the wind turbine, is difficult because the rotor may continue to rotate in the wind while attempts are made to effect replacement or repair of the component. Components connected to a rotor include, for example, the main shaft, the gearbox, the generator and the like. To prevent the rotor from rotating during replacement or repair of such components, the rotor may be locked down to prevent rotation. However, different kinds of lock mechanisms have been used depending on the particular component to be replaced or repaired because there are limited locations at which to effectively mount a lock and existing locks are often mounted on the very component that is desired to be replaced or repaired. Further, many existing locks are cumbersome or difficult to install and/or use.

There remains a need for a rotor lock that is easier to install and use and that can be used to lock a rotor irrespective of what turbine component is to be replaced or repaired.

SUMMARY

In one aspect, there is provided a lock for preventing rotation of a rotor of a wind turbine, the lock comprising: a pin support supportable on main bearing supports or main bearing support extensions in a nacelle of the wind turbine, the pin support comprising a beam and first and second clamps situated proximate ends of the beam, the clamps mountable on the main bearing supports or main bearing support extensions, the beam comprising a hub-facing face proximate a rotor hub of the wind turbine and a gearbox-facing face opposite the hub-facing face when the pin support is supported on the main bearing supports or main bearing support extensions, the beam further comprising support apertures through the beam extending between the hub-facing face and a gearbox-facing face; first and second rotatable lock pins inserted through the support apertures to rotatably mounted the lock pins on the pin support, each lock pin comprising a first cylindrical portion having a first central axis rotatably mounted through one of the support apertures and a cammed portion comprising a second cylindrical portion having a second central axis, the second cylindrical portion having a smaller diameter than the first cylindrical portion, the second cylindrical portion extending from an end of the first cylindrical portion such that the first and second central axes are not colinear, the cammed portion protruding from and extending away from the hub-facing face of the pin support toward the hub, the first cylindrical portion protruding from the gearbox-facing face, the lock pins inserted into complementary first and second rotor lock apertures, respectively, on the rotor hub when the pin support is supported on the main bearing supports or main bearing support extensions; first and second lock pin brackets, the first lock pin connected to the first bracket proximate a first end of the first bracket, the second lock pin connected to the second bracket proximate a first end of the second bracket; and, a turnbuckle for rotating the lock pins, the turnbuckle comprising a frame and first and second ends, the first end of the turnbuckle connected to the first bracket proximate a second end of the first bracket, the second end of the turnbuckle connected to the second bracket proximate a second end of the second bracket, whereby rotation of the frame of the turnbuckle causes the second end of the first bracket and the second end of the second bracket to move arcuately thereby causing the first and second lock pins connected proximate the first ends of the first and second brackets to rotate so that exterior surfaces of the cammed portions engage with interior surfaces of the complementary apertures to apply forces in opposite directions at the interior surfaces of the apertures to immobilize the lock pins in the respective apertures against the interior surfaces to prevent relative motion between the lock pins and the apertures to prevent rotation of the rotor.

In another aspect, there is provided a lock for preventing rotation of a rotor of a wind turbine, the lock comprising: a pin support supportable in a nacelle of the wind turbine, the pin support having a hub-facing face proximate a rotor hub of the wind turbine when the pin support is supported in the nacelle; a rotatable lock pin rotatably mounted on the pin support, the lock pin having a cammed portion extending away from the hub-facing face of the pin support toward the hub, the lock pin inserted into a complementary rotor lock aperture on the rotor hub when the pin support is supported in the nacelle, rotation of the lock pin causing engagement of an exterior surface of the cammed portion with an interior surface of the aperture to immobilize the lock pin against the interior surface of the aperture to prevent relative motion between the lock pin and the aperture to prevent rotation of the rotor; and, a mechanism for rotating the lock pin.

In another aspect, there is provided a lock for preventing rotation of a rotor of a wind turbine, the lock comprising: a pin support supportable in a nacelle of the wind turbine, the pin support having a hub-facing face proximate a rotor hub of the wind turbine when the pin support is supported in the nacelle; first and second rotatable lock pins rotatably mounted on the pin support, each of the lock pins having a cammed portion extending away from the hub-facing face of the pin support toward the hub, the lock pins inserted into complementary first and second rotor lock apertures, respectively, on the rotor hub when the pin support is supported in the nacelle, rotation of the lock pins causing engagement of exterior surfaces of the cammed portions with interior surfaces of the complementary apertures to immobilize the lock pins against the interior surfaces of the apertures to prevent relative motion between the lock pins and the apertures to prevent rotation of the rotor; and, a mechanism for rotating the lock pins.

Rotation of one or more cam-shaped pins fitted into one or more complementary rotor lock apertures on the rotor hub forces the one or more cam-shaped pins into engagement with interior surfaces of the apertures to secure the rotor. The camming action effectively wedges the cam-shaped pins in the rotor lock apertures to prevent any play between the pins and the apertures. In an embodiment, the rotor lock apertures may be existing rotor lock apertures on the rotor hub. In an embodiment, the one or more cam-shaped pins may be rotated by a turnbuckle, preferably one turnbuckle connected to two pins.

In an embodiment, the lock pin comprises a first cylindrical portion rotatably mounted through a support aperture in the pin support. The first cylindrical portion has a first central axis. In an embodiment, the cammed portion of the lock pin is a second cylindrical portion of the lock pin. The second cylindrical portion has a second central axis. In an embodiment, the second cylindrical portion has a different diameter, preferably a smaller diameter, than the first cylindrical portion. In an embodiment, the second cylindrical portion extends from an end of the first cylindrical portion such that the first and second central axes are not colinear. In an embodiment, the lock pin is rotatable about the first central axis, the second central axis rotating about the first central axis when the pin is rotated. In an embodiment, rotation of the lock pin about the first central axis causes the cammed portion, for example the second cylindrical portion, to move laterally across the rotor lock aperture to engage or disengage from the interior surface of the rotor lock aperture.

In an embodiment, the mechanism for rotating the lock pin comprises a turnbuckle. In an embodiment, the turnbuckle is linked to the lock pin such that rotation of a frame of the turnbuckle causes rotation of the lock pin. In an embodiment, the mechanism for rotating the lock pin comprises a lock pin bracket, the lock pin connected to the bracket. In an embodiment, the lock pin is connected to the lock pin bracket proximate a first end of the bracket and the turnbuckle is connected to the lock pin bracket proximate a second end of the bracket. In an embodiment, rotation of the frame of the turnbuckle causes the second end of the bracket to move arcuately thereby causing the lock pin connected proximate the first end of the bracket to rotate. In an embodiment, when the lock pin is rotated, the lock pin applies a force on the interior surface of the rotor lock aperture to immobilize the lock pin the rotor lock aperture.

In an embodiment, the lock pin comprises first and second lock pins. In an embodiment, the mechanism for rotating the lock pin comprises first and second lock pin brackets. In an embodiment, the first lock pin is connected to the first lock pin bracket proximate a first end of the first bracket. In an embodiment, the turnbuckle comprises a first end and a second end. In an embodiment, the first end of the turnbuckle is connected to the first bracket proximate a second end of the first bracket. In an embodiment, the second lock pin is connected to the second bracket proximate a first end of the second bracket. In an embodiment, the second end of the turnbuckle is connected to the second bracket proximate a second end of the second bracket. In an embodiment, rotation of the frame of the turnbuckle causes the second end of the first bracket and the second end of the second bracket to move arcuately thereby causing the first and second lock pins connected proximate the first ends of the first and second brackets to rotate. In an embodiment, when rotated, the first and second lock pins apply force at the interior surfaces of the first and second apertures in opposite directions to immobilize the lock pins in the respective apertures.

In an embodiment, the pin support comprises fasteners for securing the pin support on the main bearing supports or main bearing support extensions. In an embodiment, the pin support comprises a beam. In an embodiment, the fasteners comprise first and second clamps situated proximate ends of the beam. In an embodiment, the clamps are mountable on the main bearing supports or main bearing support extensions. In an embodiment, the support aperture for each lock pin is a through aperture through the beam between the hub-facing face and a gearbox-facing face of the beam. In an embodiment, the lock pin is inserted through the through aperture so that the cammed portion protrudes from the hub-facing face and the first cylindrical portion protrudes from the gearbox-facing face. In an embodiment, the pin support is supportable on main bearing supports or main bearing support extensions in the nacelle. Being mountable on the main bearing supports or main bearing support extensions, the rotor lock is useable to lock the rotor irrespective of the turbine component to be replaced or repaired.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
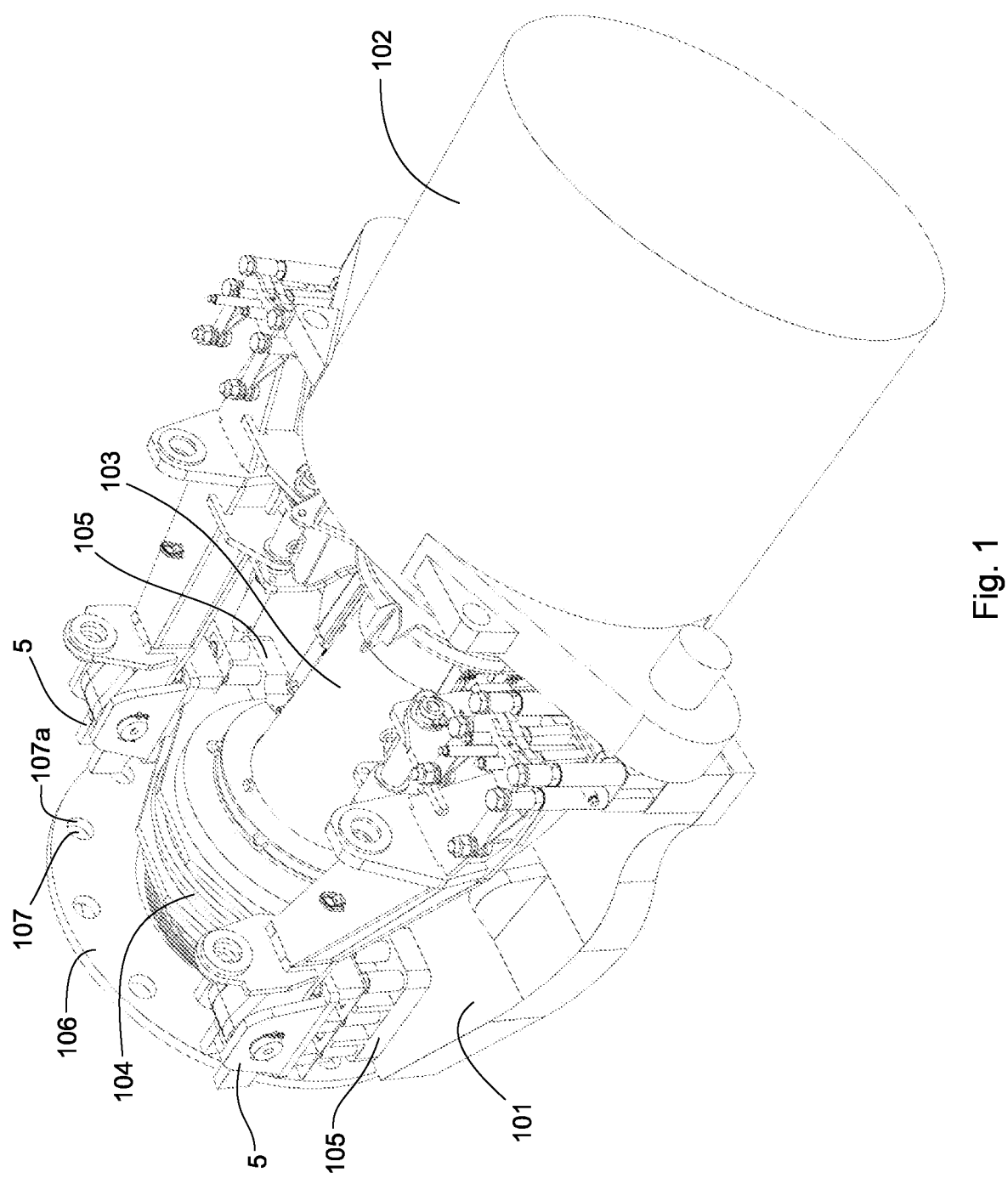
FIG. 1 depicts a rear perspective view of an interior of a nacelle showing existing rotor hub flange, main bearing, main bearing supports and main rotor shaft of a wind turbine.
Figure 2:
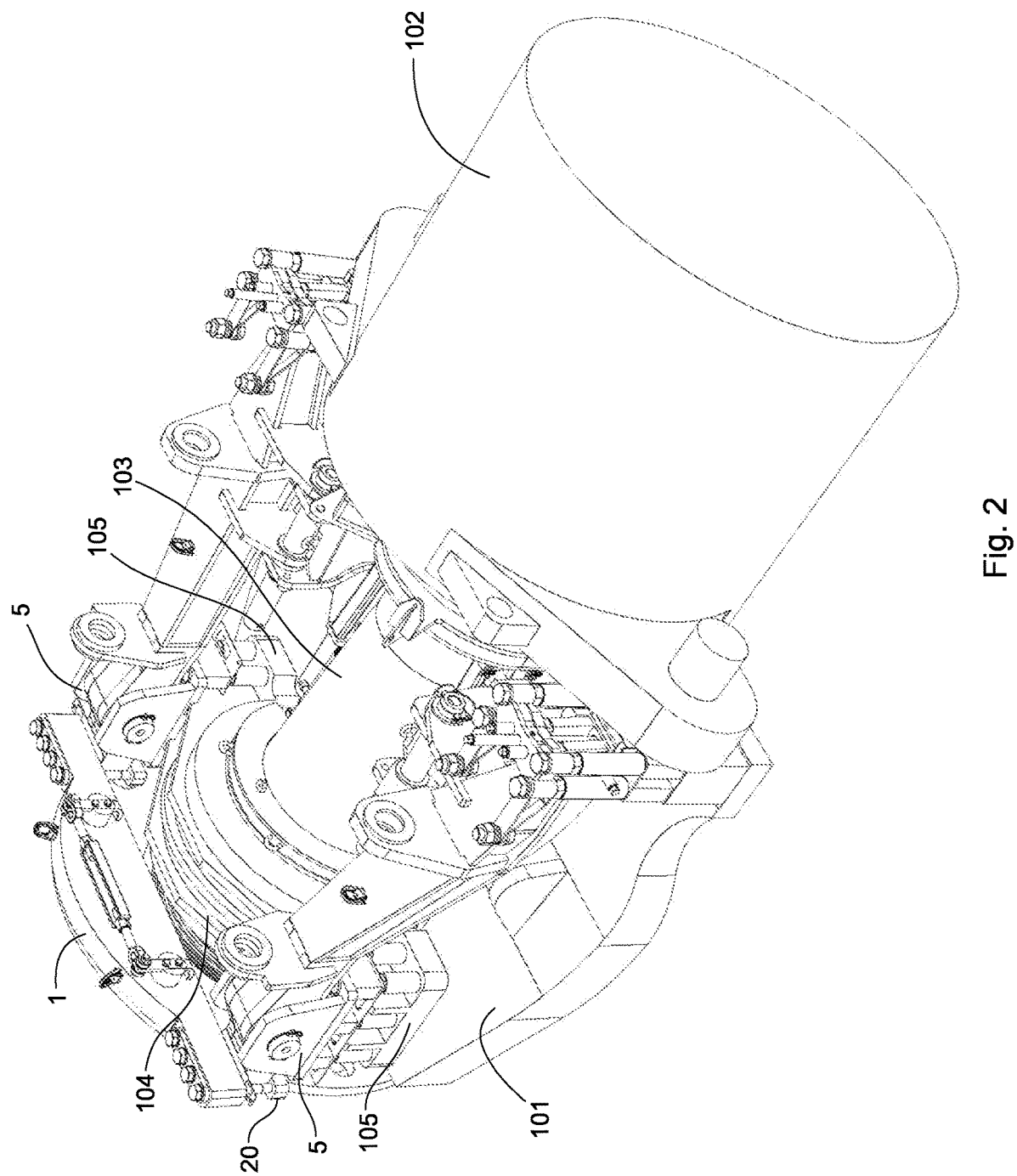
FIG. 2 depicts a rear perspective view of the nacelle of FIG. 1 further showing a rotor lock of the present invention supported on the main bearing supports.
Figure 3:
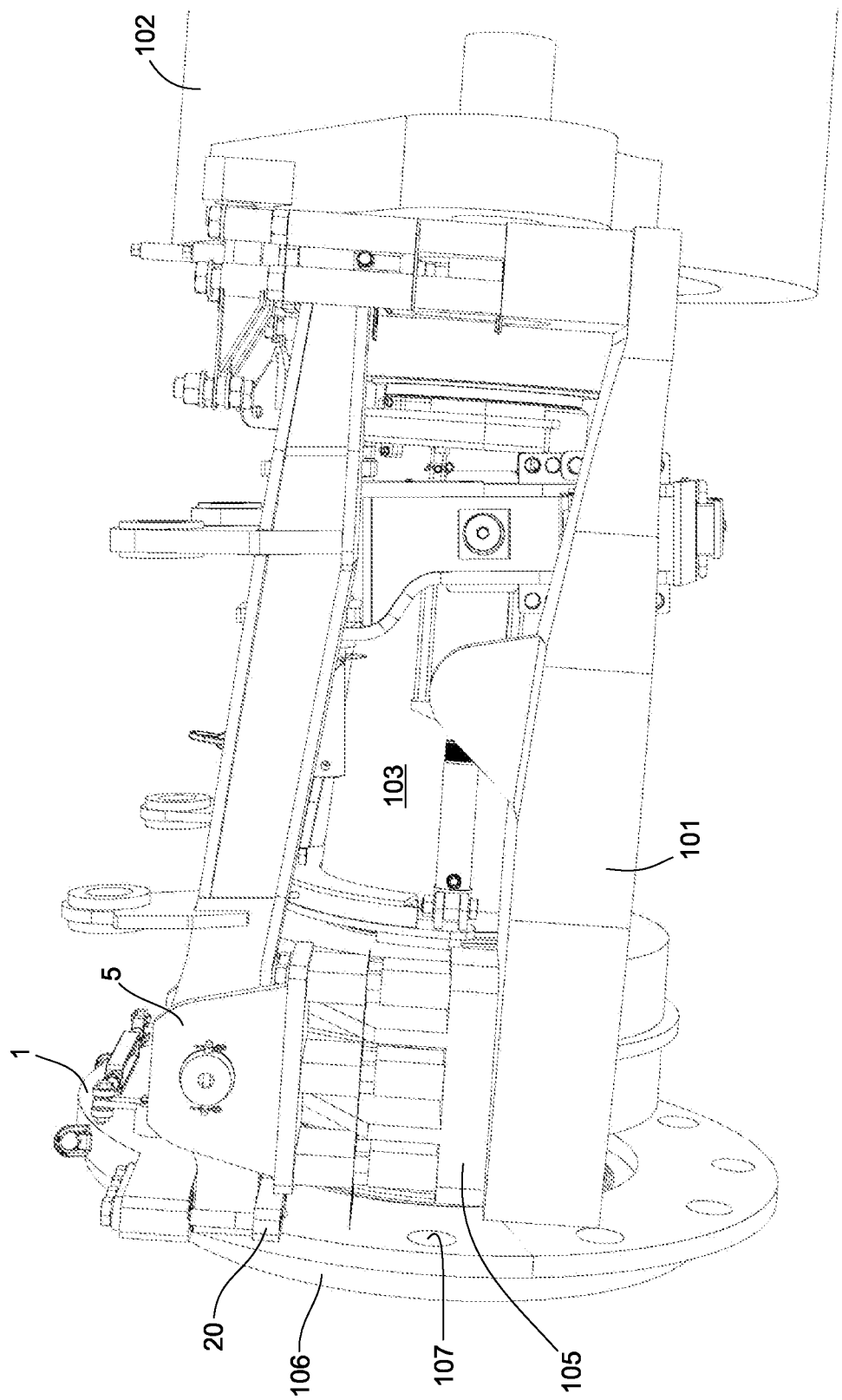
FIG. 3 depicts a side perspective view of FIG. 2.
Figure 4:
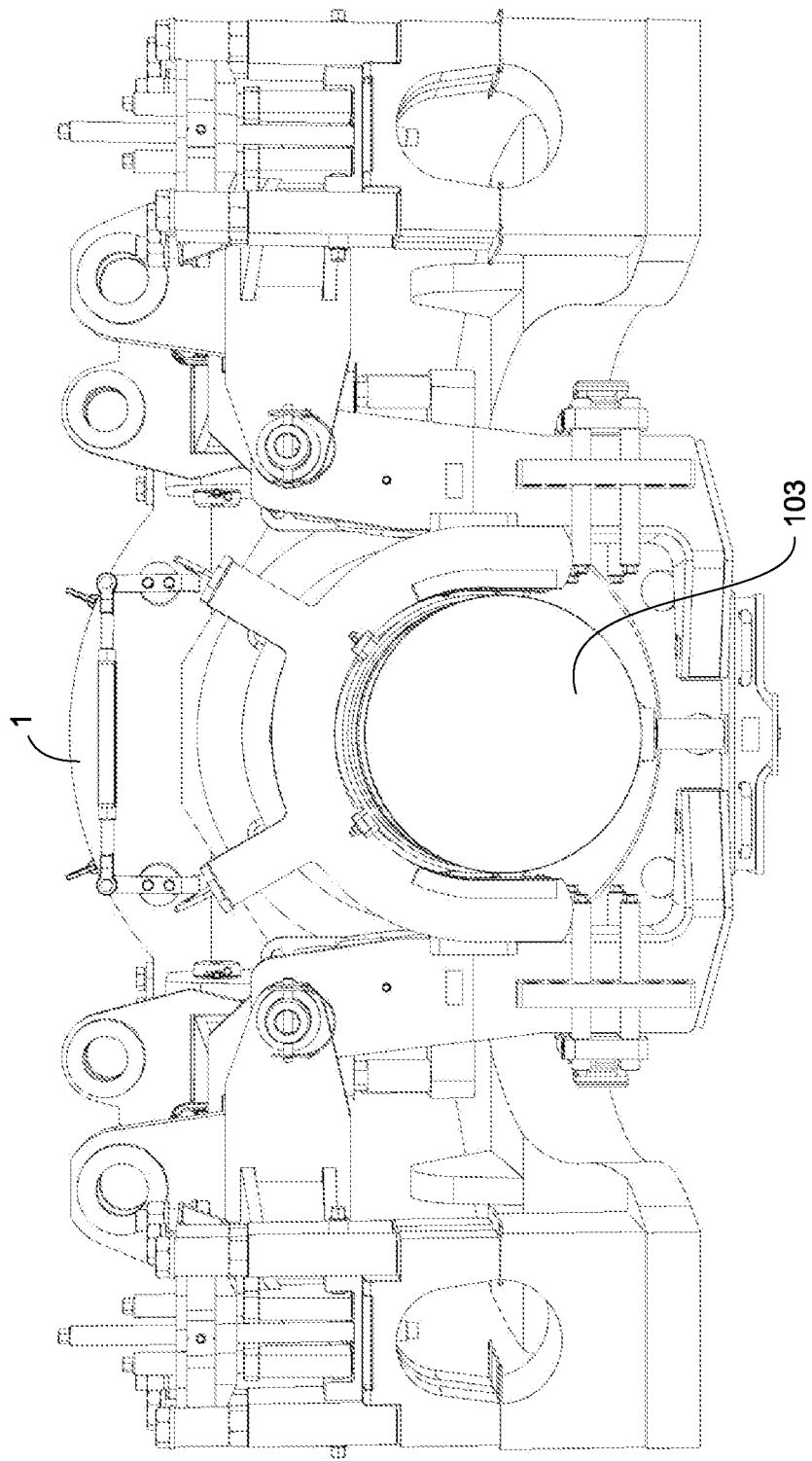
FIG. 4 depicts a rear view of FIG. 2.

Referring to FIG. 1, a nacelle of a wind turbine houses a bed plate 101, a gear box 102, a main rotor shaft 103, a main bearing 104, main bearing supports 105 and a rotor hub flange 106 having a plurality of rotor lock apertures 107 (only one labeled), as is known in the prior art.

Referring to the Figures, a rotor lock 1 of the present invention is mountable on main bearing support extensions 5, the main bearing support extensions 5 being brought up to the nacelle and mounted on the main bearing supports 105 to provide locations on which cranes and other accessories may be temporarily mounted in the nacelle. The rotor lock 1 comprises a main disk, for example a beam 10 as illustrated although other forms of main disk are possible, having a longitudinal axis that extends laterally across the nacelle between the main bearing supports 105 over the rotor bearing 104 proximate to and to a rear face of the rotor hub flange 106. The beam 10 comprises spaced-apart eye plates 13 for connection to a lifting apparatus to permit lifting the rotor lock 1 up to the nacelle and positioning the rotor lock 1 on the main bearing support extensions 5.

Ends of the beam 10 are equipped with clamps 20 that secure the rotor lock 1 to protrusions extending forwardly from the main bearing support extensions 5. Each clamp 20 comprises a bolt plate 21 and a shim plate 22 between which the protrusion is clamped, and a plurality of bolts 23 inserted through bolt holes 24 extending between top and bottom surfaces of the beam 10. The bolts 23 extend through corresponding apertures in a pressure plate 25 on the top surface of the beam 10, and extend into threaded apertures in a top surface of the bolt plate 21. Tightening the bolts 23 provides the pressure to clamp the protrusions between the bolt plates 21 and shim plates 22 to secure the rotor lock 1 on the main bearing support extensions 5. The rotor lock 1 may be dismounted by loosening the bolts 23.

The beam 10 comprises two spaced-apart pin support apertures 12, which are aligned with two corresponding rotor lock apertures 107 in the rotor hub flange 106 when the rotor lock 1 is mounted on the main bearing support extensions 5. Lock pins 30 extend through the pin support apertures 12, one end of each lock pin 30 protruding rearwardly from a rear face of the beam 10 and another end of each lock pin 30 protruding forwardly from a front face of the beam 10. Each pin 30 comprises a first portion 31 and a second portion 32. The first portion 31 occupies and is rotatable within the pin support aperture 12, and protrudes rearwardly from the rear face of the beam 10. The second portion 32 protrudes forwardly from the front face of the beam 10. With the rotor lock 1 mounted on the main bearing support extensions 5, the second portion 32 extends into one of the rotor lock apertures 107 in the rotor hub flange 106. While two lock pins are illustrated, one lock pin or more than two lock pins may be employed instead. Shims between bottoms of the bolt plates 21 of the clamps 20 and the main bearing support extensions 5 may be used to adjust tightness of the lock pins 30 in the rotor lock apertures 107.

Figure 16:
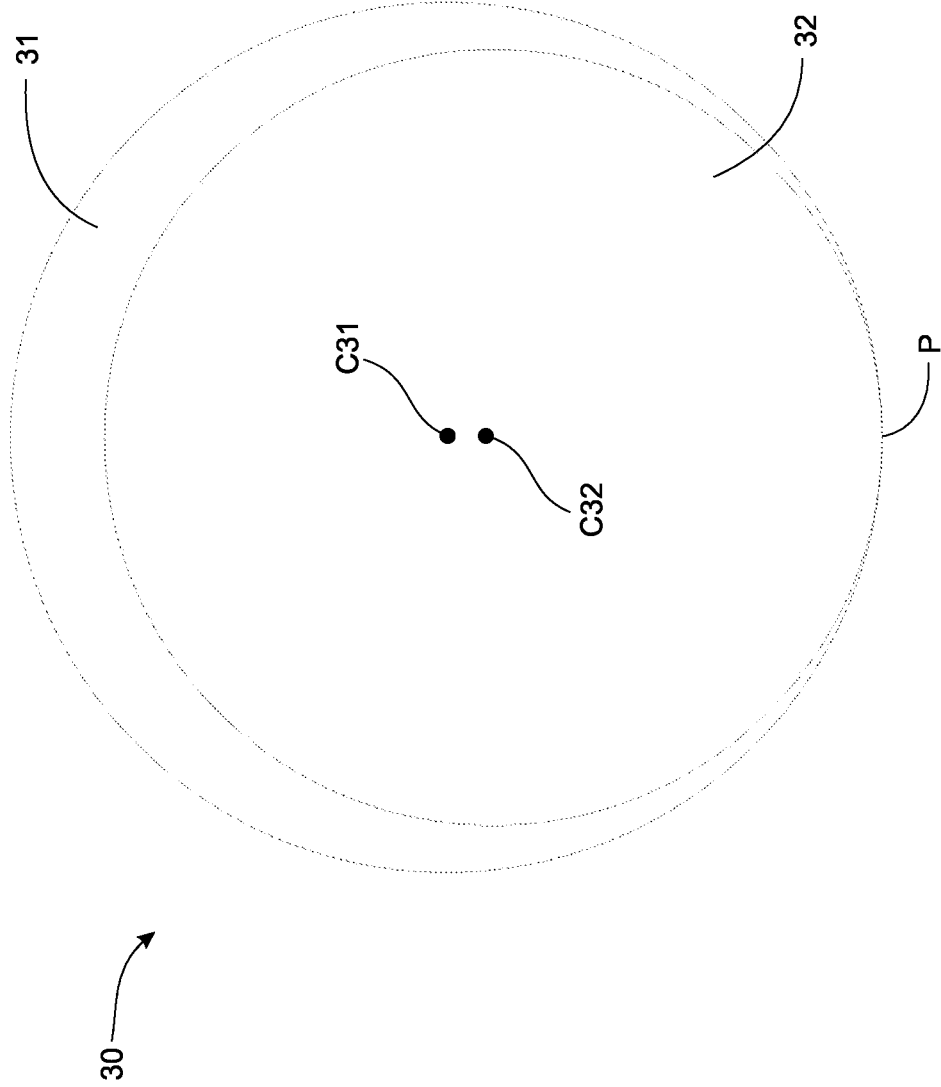
FIG. 16 depicts a front view of the rotor lock pin of FIG. 15.
Figure 17:
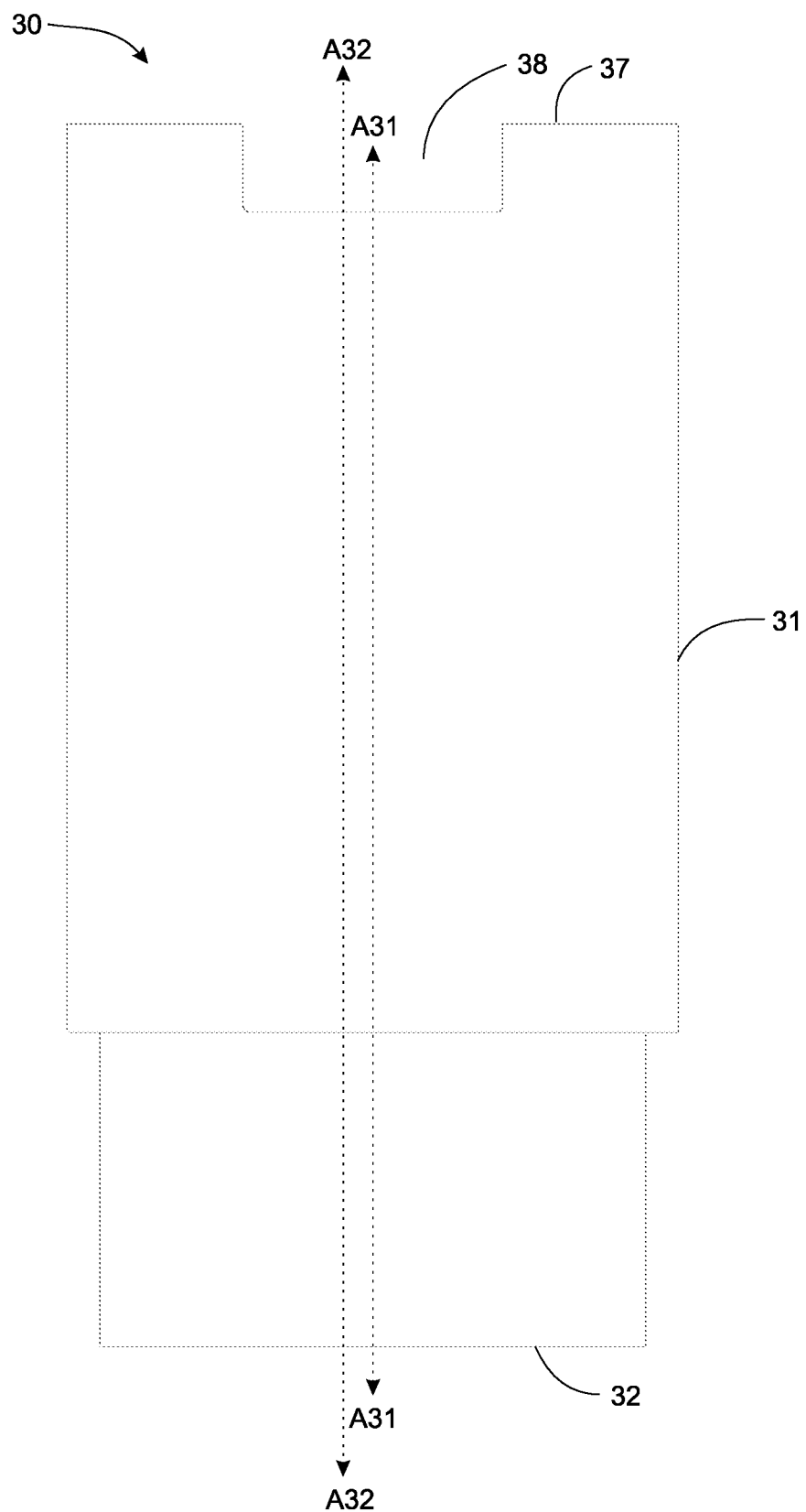
FIG. 17 depicts a top view of the rotor lock pin of FIG. 15.
Figure 20:
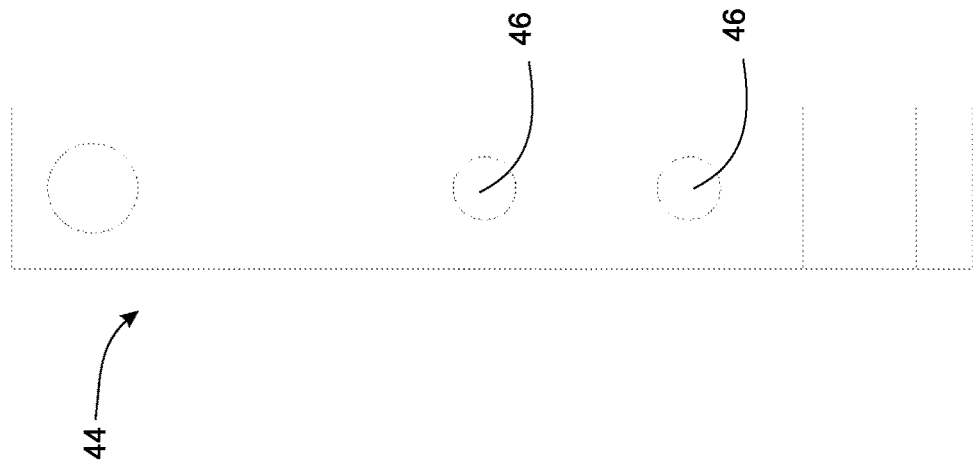
FIG. 20 depicts a rear view of the rotor lock pin bracket of FIG. 18.
Figure 19:
FIG. 19 depicts a side view of the rotor lock pin bracket of FIG. 18.
Figure 18:
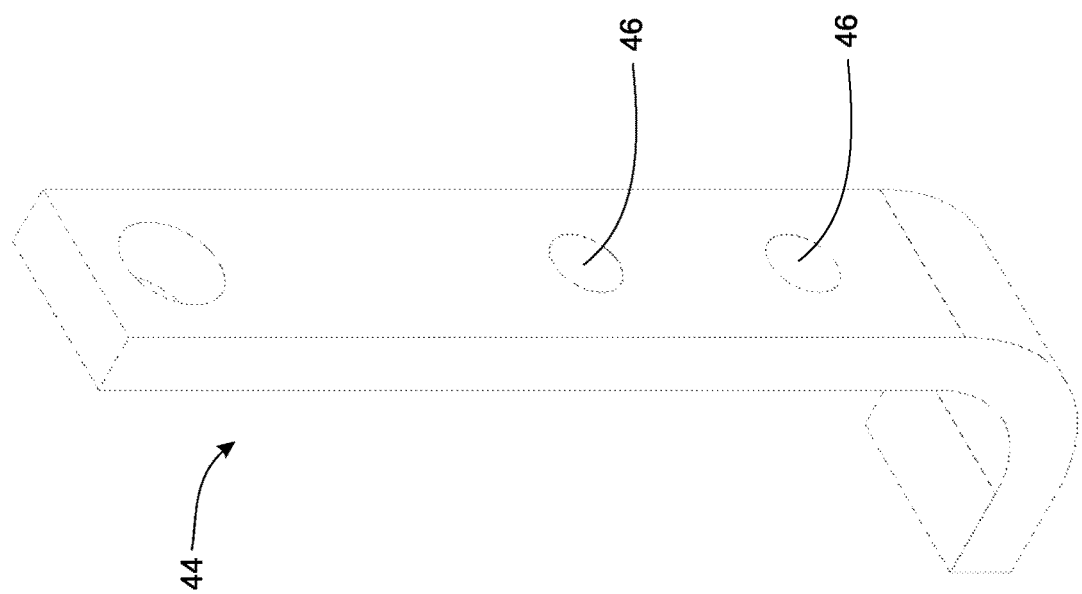
FIG. 18 depicts a rear perspective view of a rotor lock pin bracket of the rotor lock of FIG. 10.

As best seen in FIG. 16 and FIG. 17, the first portion 31 has a larger diameter than the second portion 32. Further, a center C32 of the second portion 32 is offset from a center C31 of the first portion 31 so that central axes A31, A32 of the first and second portions 31, 32, respectively, are parallel but not colinear. When the lock pin 30 rotates, the lock pin 30 rotates about the axis through C31 with the axis through C32 also rotating about the axis C31. Perimeters of the first and second portions 31, 32 may share a common point P, but the perimeter of the second portion 32 does not extend beyond the perimeter of the first portion 31. While the two perimeters may share a common point, in some embodiments the perimeter of the second portion 32 may be wholly inside the perimeter of the first portion 31. When the lock pin 30 is rotated the second portion 32, the center C32 follows a path that describes an arc around the center C31. When the second portion 32 extends into one of the rotor lock apertures 107, rotation of the lock pin 30 also results in movement of the second portion 32 laterally inside the rotor lock aperture 107. Lateral movement of the second portion 32, i.e. camming action, brings an outside surface 33 of the second portion 32 into contact with an inner surface 107a (see FIG. 1) of the rotor lock aperture 107. Maintaining contact between the outside surface 33 of the second portion 32 and the inner surface 107a of the rotor lock aperture 107 arrests rotation of the rotor thereby locking the rotor in place. The rotor can be released by reversing the rotation of the lock pin 30 to disengage the outside surface 33 of the second portion 32 from the inner surface 107a of the rotor lock aperture 107. While the first and second portions 31, 32 of the lock pin 30 are shown as cylinders, the second portion 32 could be some other shape, for example elliptical, that can be inserted into the rotor lock aperture 107 and engage the inner surface 107a of the rotor lock aperture 107 when the lock pin 30 is rotated.

The lock pins 30 may be rotated by a pin rotating mechanism 40 comprising a force applicator, for example a turnbuckle 41 as illustrated or some other device for applying force such as a lever or a crank. The turnbuckle 41 comprises a frame 42 having threaded apertures at each end through which jaw bolts are threaded. The jaw bolts are pivotally connected to ends of lock pin brackets 44, the lock pin brackets 44 connected by bolts 45 inserted through bracket apertures 46 to the lock pins 30. The bolts 45 are threaded into bolt holes 36 in rear ends 37 of the first portions 31 of the lock pins 30. For greater security, the rear ends 37 of the first portions 31 of the lock pins 30 comprise channels 38 sized to snugly fit the lock pin brackets 44 therein.

Figure 5:
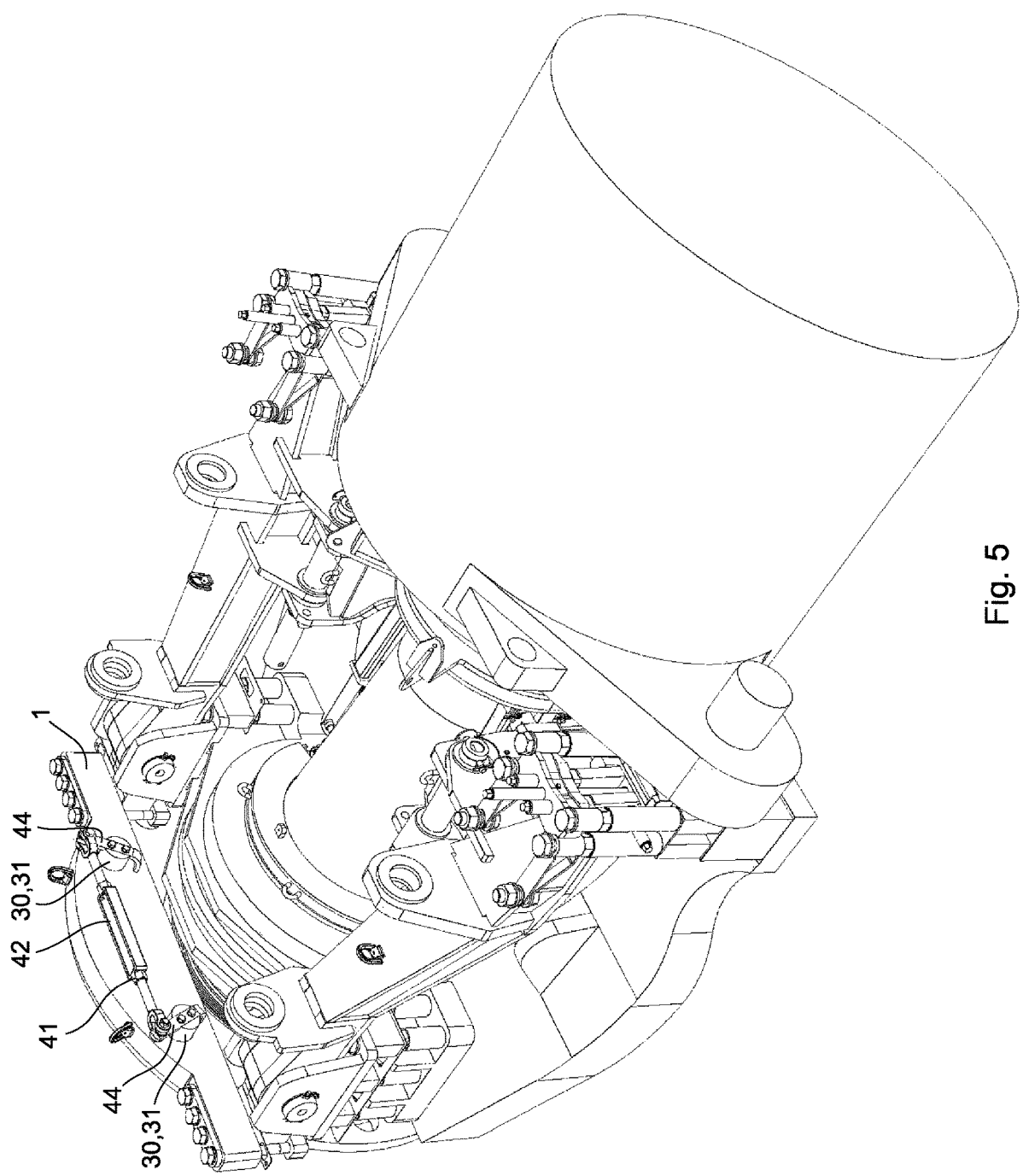
FIG. 5 depicts FIG. 2 with the rotor lock in a fully open configuration.
Figure 6:
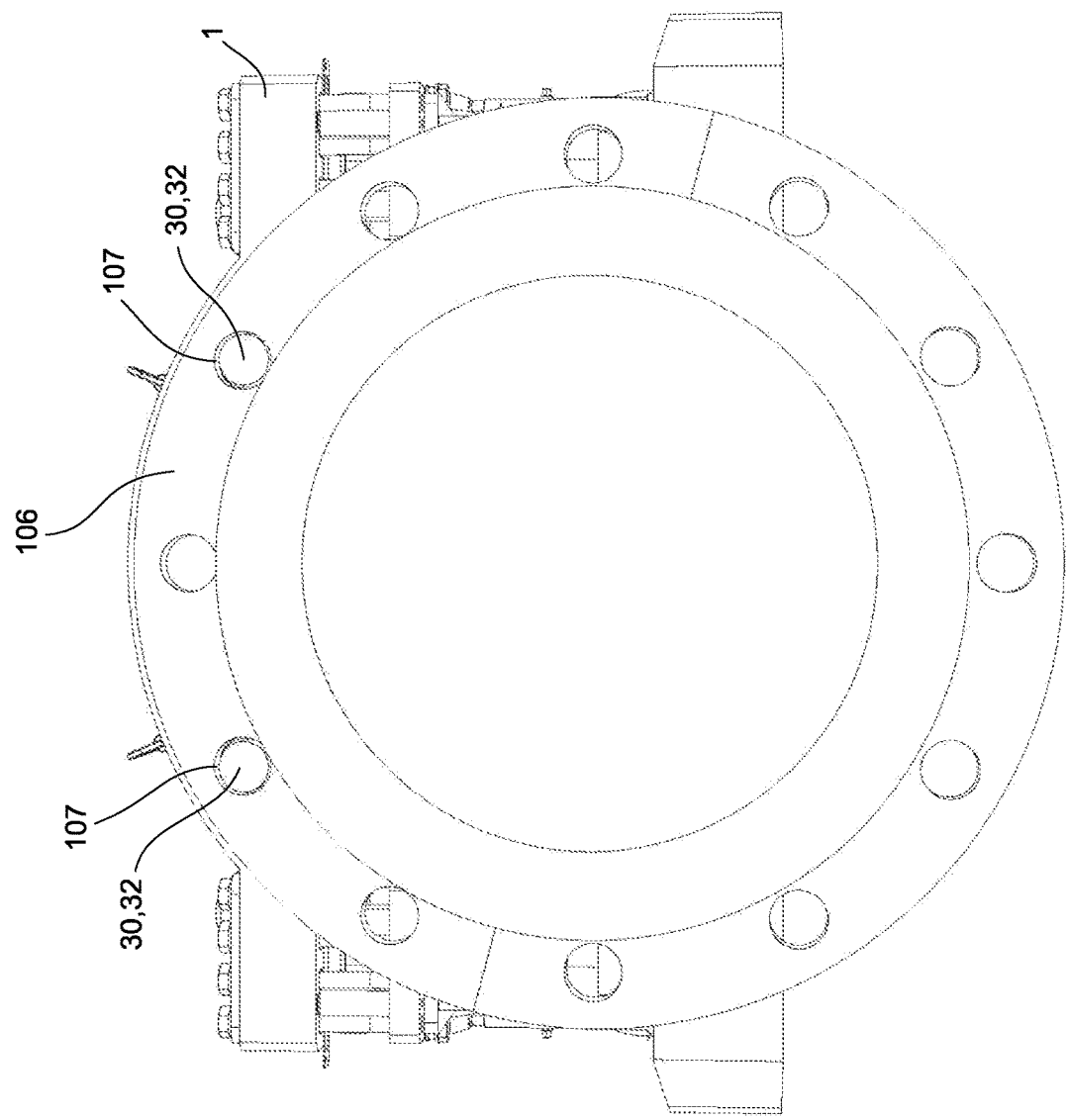
FIG. 6 depicts a front view of FIG. 5.
Figure 7:
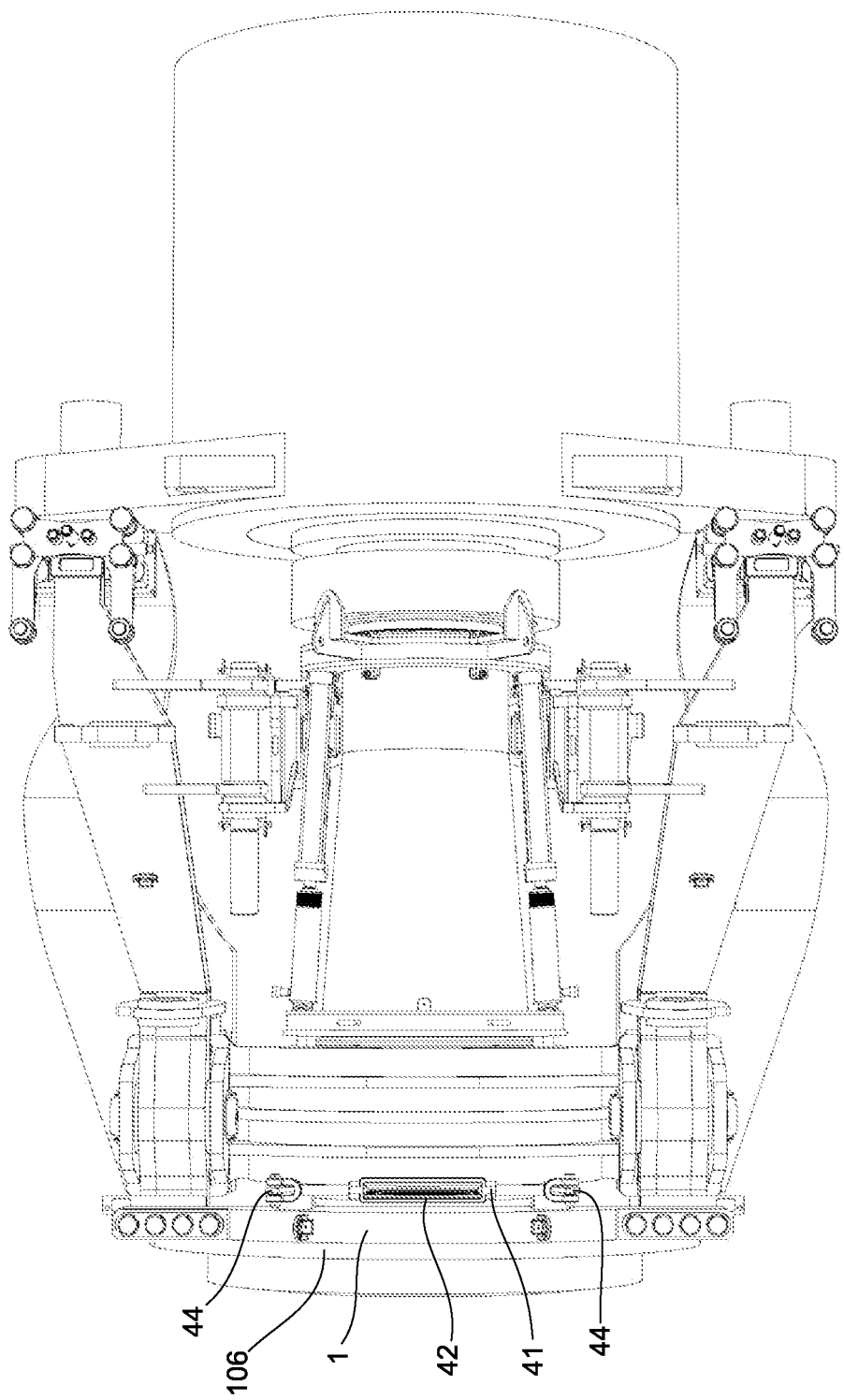
FIG. 7 depicts a top view of FIG. 5.
Figure 8:
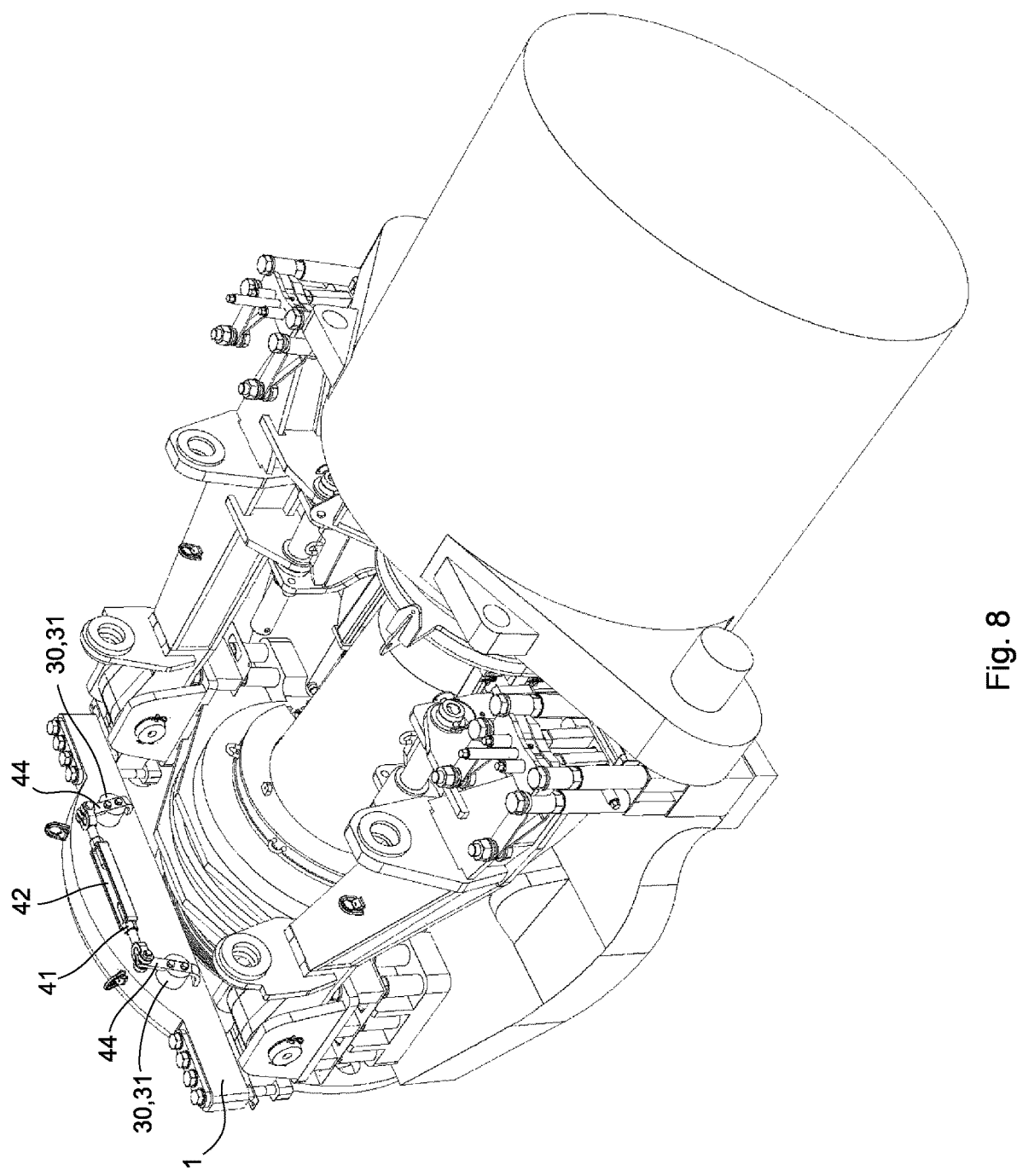
FIG. 8 depicts FIG. 2 with the rotor lock in a fully closed configuration.
Figure 9:
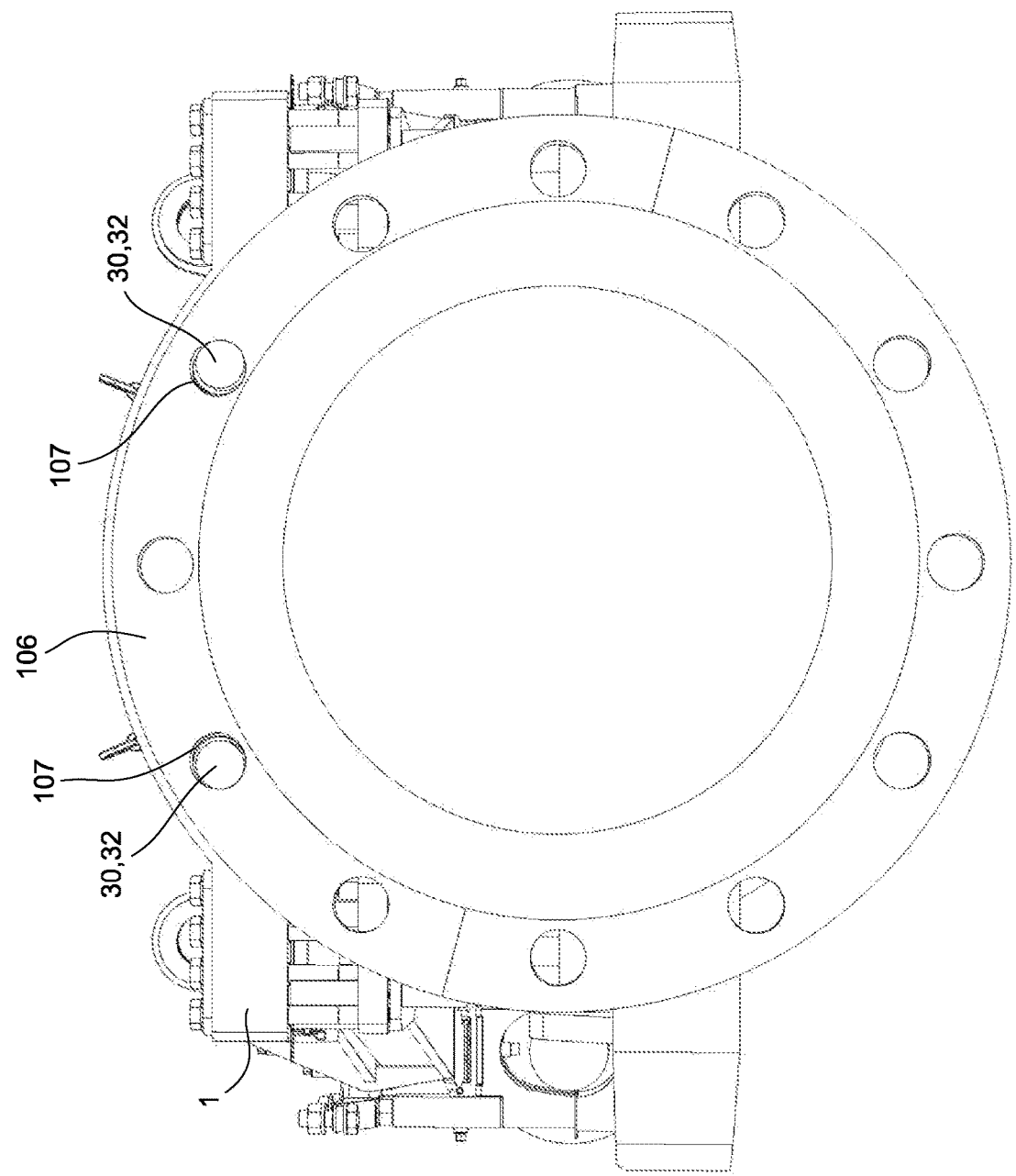
FIG. 9 depicts a front view of FIG. 8.
Figure 10:
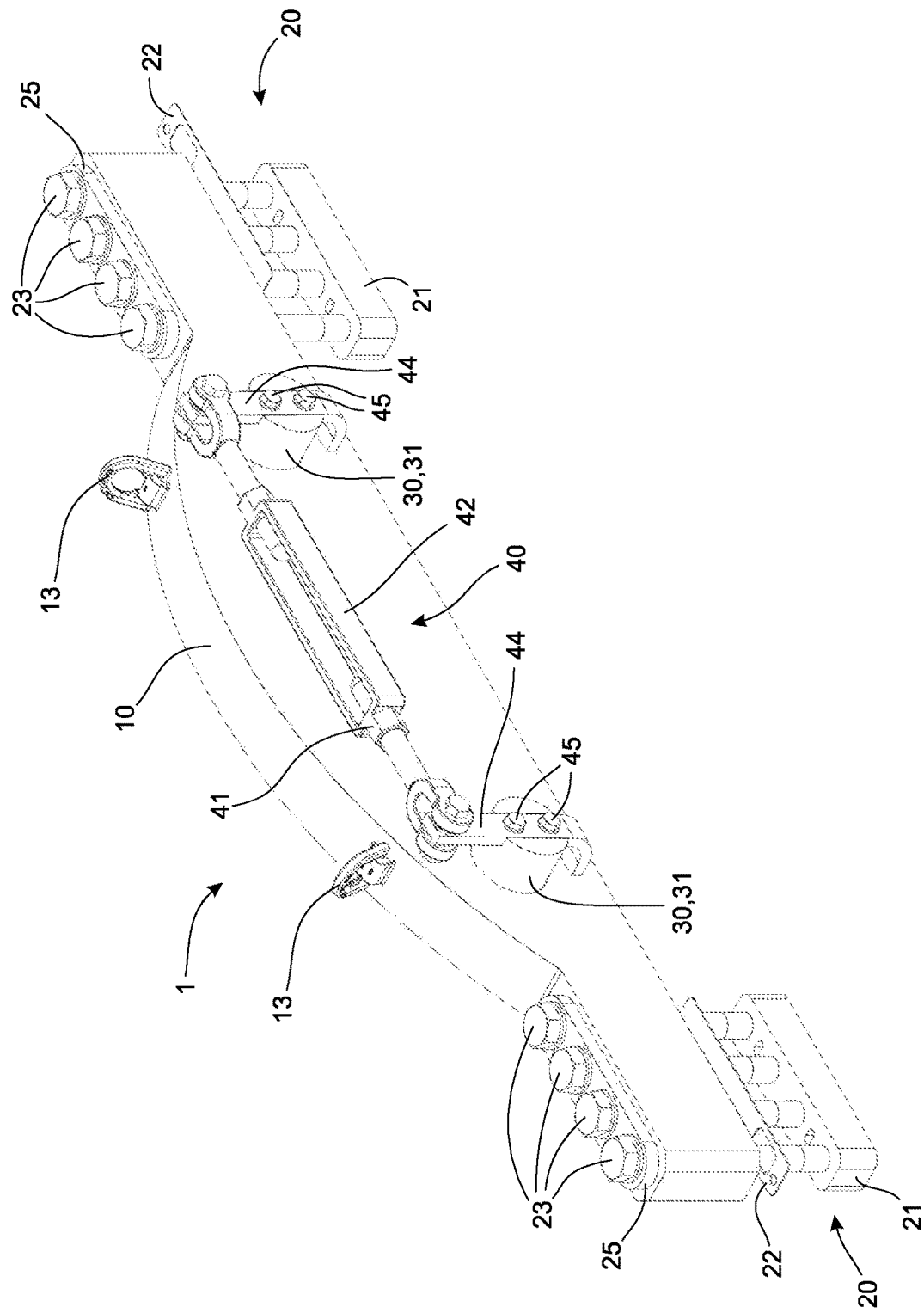
FIG. 10 depicts a rear perspective view of the rotor lock shown in FIG. 2.
Figure 11:
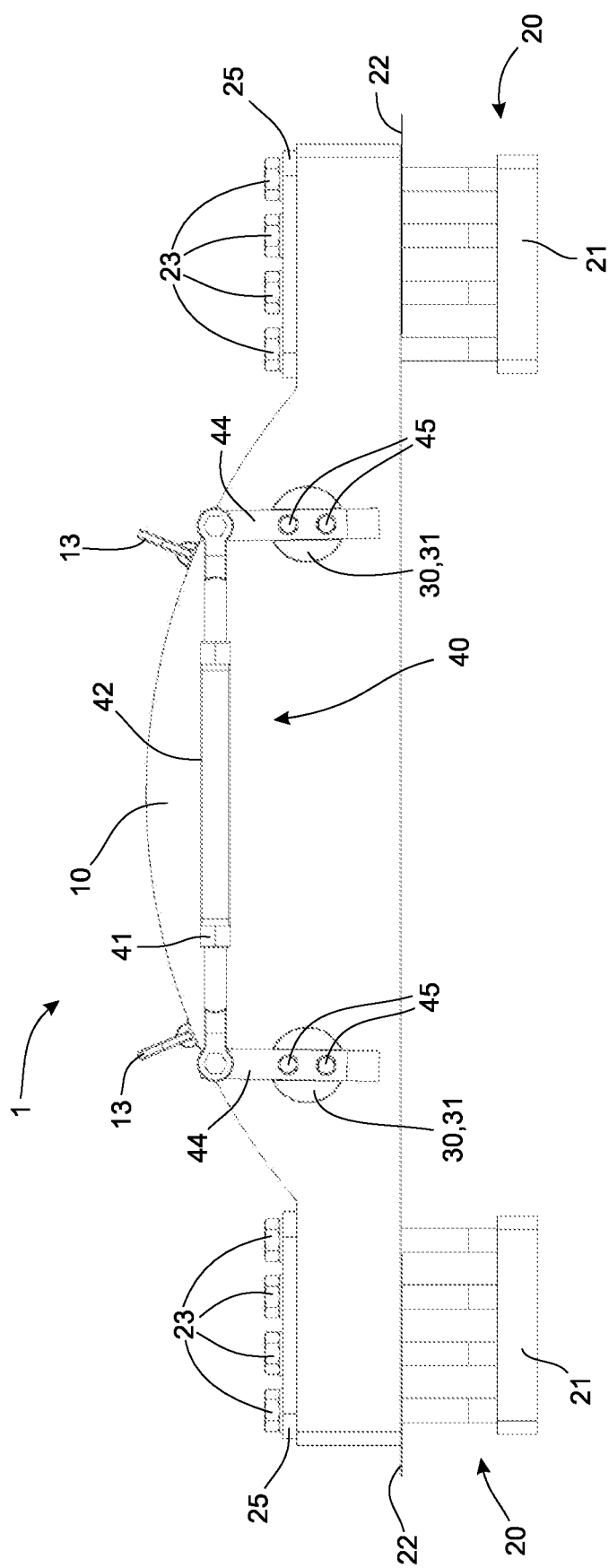
FIG. 11 depicts a rear view of the rotor lock of FIG. 10.
Figure 12:
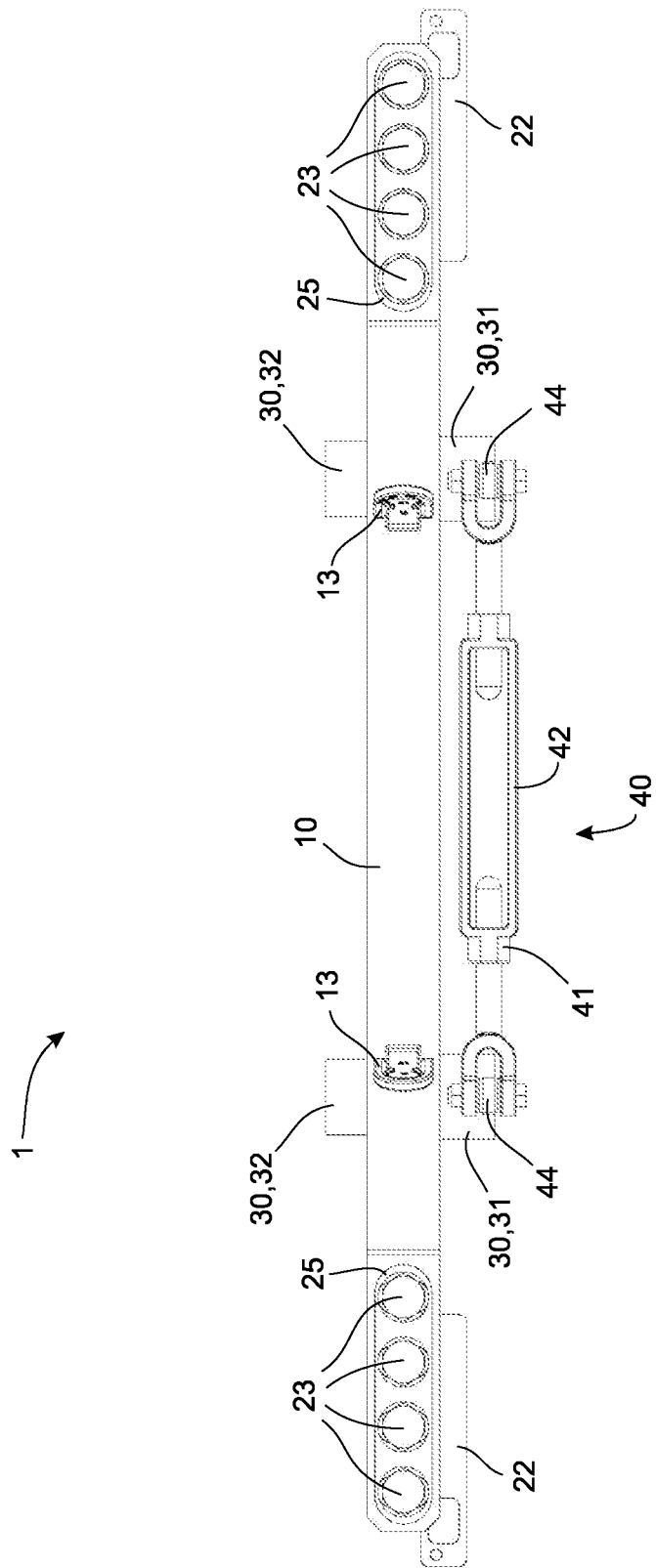
FIG. 12 depicts a top view of the rotor lock of FIG. 10.
Figure 13:
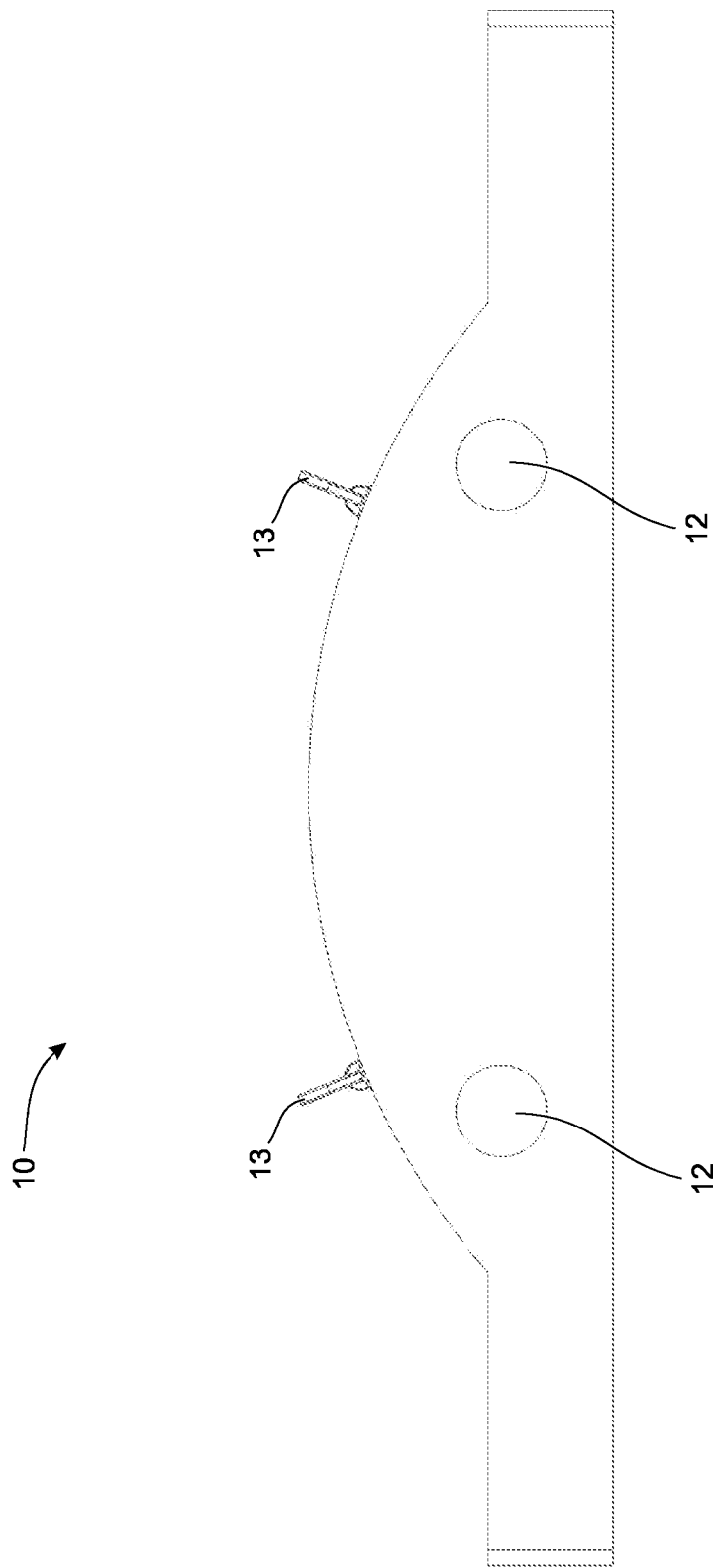
FIG. 13 depicts a rear view of a rotor lock main disk of the rotor lock of FIG. 10.
Figure 14:
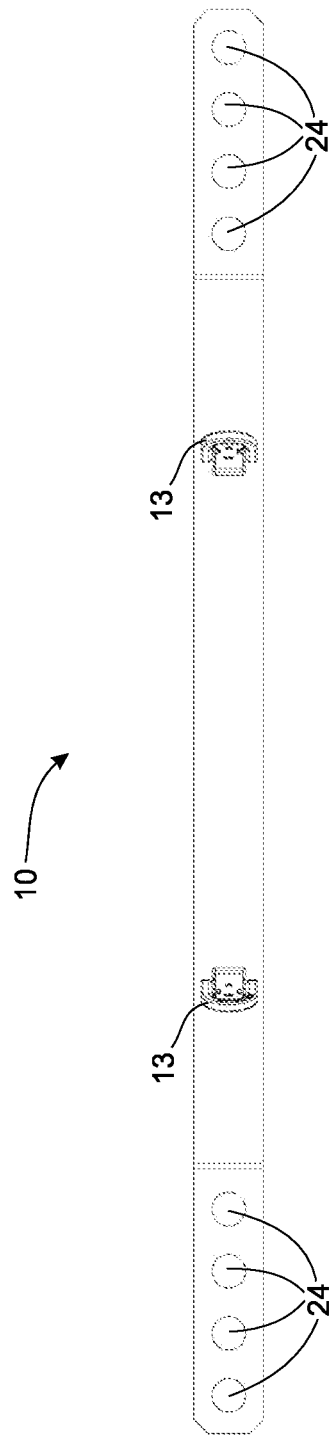
FIG. 14 depicts a top view of the rotor lock main disk of FIG. 13.
Figure 15:
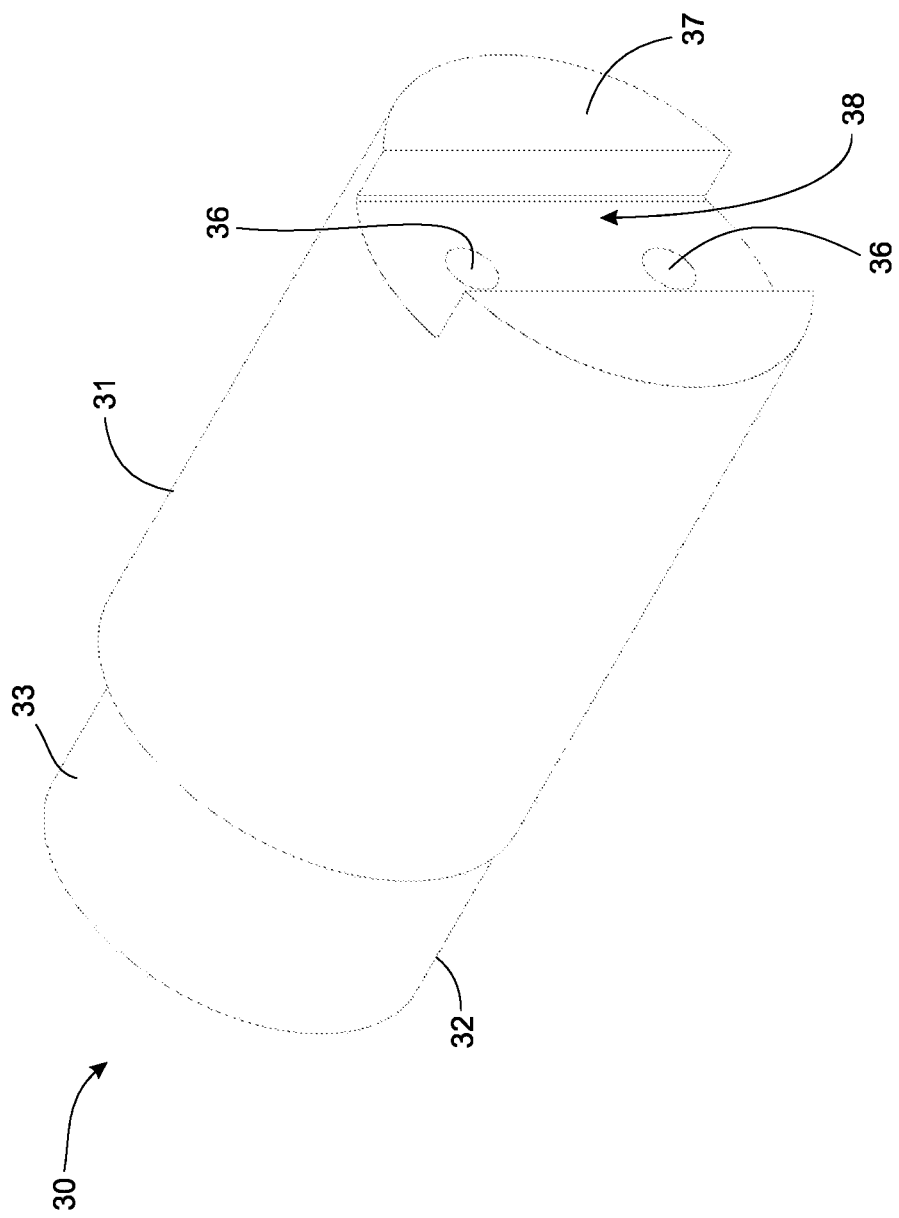
FIG. 15 depicts a rear perspective view of a rotor lock pin of the rotor lock of FIG. 10.

Rotation of the frame 42 of the turnbuckle 41 causes the jaw bolts to extend or retract thereby causing the ends of the lock pin brackets 44 to translate, which in turn causes the lock pins 30 to rotate. FIG. 5 to FIG. 7 show the rotor lock 1 in a fully open configuration where the ends of the lock pin brackets 44 are pushed slightly but not fully apart from vertical, whereas FIG. 8 and FIG. 9 show the rotor lock 1 in a first fully closed configuration where the ends of the lock pin brackets 44 are pulled together from the vertical. A second fully closed configuration occurs when the lock pin brackets 44 are pushed fully apart from the vertical. As best seen in FIG. 6, in the fully open configuration, it is possible to insert and retract the lock pins 30 into and out of the rotor lock apertures 107, and there is some tolerance between the outside surfaces 33 of the second portions 32 of the lock pins 30 and the inner surfaces 107a of the rotor lock apertures 107 so that the rotor is capable of some, if only a small amount of, rotational movement. As best seen in FIG. 9, in the first fully closed configuration, the outside surfaces 33 of the second portions 32 of the lock pins 30 are engaged with the inner surfaces 107a of the rotor lock apertures 107 so that the rotor cannot rotate, the turnbuckle 41 holding the ends of the lock pin brackets 44 in place to prevent the lock pins 30 from rotating even a small amount. In the first fully closed configuration, force is applied against the inner surfaces 107a of the rotor lock apertures 107 by the outside surfaces 33 of the second portions 32 of the lock pins 30 in opposite directions. As seen in FIG. 9, the second portion 32 of the right-side lock pin 30 is engaged with the inner surface 107a of the right-side rotor lock aperture 107 on the right side, while the second portion 32 of the left-side lock pin 30 is engaged with the inner surface 107a of the left-side rotor lock aperture 107 on the left side. The forces applied by the lock pins 30 in the rotor lock apertures 107 are therefore in the opposite direction away from each other. In the second fully closed configuration, the second portion 32 of the right-side lock pin 30 is engaged with the inner surface 107a of the right-side rotor lock aperture 107 on the left side, while the second portion 32 of the left-side lock pin 30 is engaged with the inner surface 107a of the left-side rotor lock aperture 107 on the right side. The forces applied by the lock pins 30 in the rotor lock apertures 107 are therefore in the opposite direction toward each other. The first fully closed configuration is preferred in use.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A lock for preventing rotation of a rotor of a wind turbine, the lock comprising:
   a pin support supportable in a nacelle of the wind turbine, the pin support having a hub-facing face proximate a rotor hub of the wind turbine when the pin support is supported in the nacelle;
   a rotatable lock pin rotatably mounted on the pin support, the lock pin having a cammed portion extending away from the hub-facing face of the pin support toward the hub, the lock pin inserted into a complementary rotor lock aperture on the rotor hub when the pin support is supported in the nacelle, rotation of the lock pin causing engagement of an exterior surface of the cammed portion with an interior surface of the complementary aperture to immobilize the lock pin against the interior surface of the complementary aperture to prevent relative motion between the lock pin and the complementary aperture to prevent rotation of the rotor, the lock pin comprising a first cylindrical portion rotatably mounted through a support aperture in the pin support, the first cylindrical portion having a first central axis, the cammed portion of the lock pin being a second cylindrical portion of the lock pin having a second central axis, the second cylindrical portion having a different diameter than the first cylindrical portion, the second cylindrical portion extending from an end of the first cylindrical portion such that the first and second central axes are not colinear;
   a force applicator comprising a turnbuckle for rotating the lock pin; and,
   a lock pin bracket, the lock pin connected to the bracket proximate a first end of the bracket and the force applicator connected to the bracket proximate a second end of the bracket, whereby rotation of the force applicator causes the second end of the bracket to move arcuately thereby causing the lock pin connected proximate the first end of the bracket to rotate.

2. The lock of claim 1 further comprising fasteners for securing the pin support on main bearing supports or main bearing support extensions.

3. The lock of claim 1, wherein the pin support is supportable on main bearing supports or main bearing support extensions in the nacelle.

4. A lock for preventing rotation of a rotor of a wind turbine, the lock comprising:
   a pin support supportable in a nacelle of the wind turbine, the pin support having a hub-facing face proximate a rotor hub of the wind turbine when the pin support is supported in the nacelle;
   first and second rotatable lock pins rotatably mounted on the pin support, each of the lock pins having a cammed portion extending away from the hub-facing face of the pin support toward the hub, the lock pins inserted into complementary first and second rotor lock apertures, respectively, on the rotor hub when the pin support is supported in the nacelle, rotation of the lock pins causing engagement of exterior surfaces of the cammed portions with interior surfaces of the complementary apertures to immobilize the lock pins against the interior surfaces of the complementary apertures to prevent relative motion between the lock pins and the complementary apertures to prevent rotation of the rotor; and,
   a single force applicator for rotating both of the lock pins simultaneously.

5. The lock of claim 4, wherein the first and second lock pins apply force at the interior surfaces of the first and second complementary apertures in opposite directions to immobilize the lock pins in the respective apertures.

6. The lock of claim 4, further comprising first and second lock pin brackets,
   the first lock pin connected to the first bracket proximate a first end of the first bracket, and a first end of the force applicator connected to the first bracket proximate a second end of the first bracket,
   the second lock pin connected to the second bracket proximate a first end of the second bracket, and a second end of the force applicator connected to the second bracket proximate a second end of the second bracket,
   whereby rotation of the force applicator causes the second end of the first bracket and the second end of the second bracket to move arcuately thereby causing the first and second lock pins connected proximate the first ends of the first and second brackets to rotate.

7. The lock of claim 6, wherein:
   each lock pin comprises a first cylindrical portion rotatably mounted through a respective support aperture in the pin support, the first cylindrical portion having a first central axis; and,
   the cammed portion of each lock pin is a second cylindrical portion of the lock pin having a second central axis, the second cylindrical portion having a different diameter than the first cylindrical portion, the second cylindrical portion extending from an end of the first cylindrical portion such that the first and second central axes are not colinear.

8. The lock of claim 7, wherein, for each lock pin, the second cylindrical portion has a smaller diameter than the first cylindrical portion.

9. The lock of claim 7, wherein the pin support comprises:
   a beam; and,
   first and second clamps situated proximate ends of the beam, the clamps mountable on main bearing supports or main bearing support extensions,
   whereby the support aperture for each lock pin is a through aperture through the beam between the hub-facing face and a gearbox-facing face of the beam, each lock pin inserted through a corresponding one of the through apertures so that the cammed portion protrudes from the hub-facing face and the first cylindrical portion protrudes from the gearbox-facing face.

10. The lock of claim 4, wherein the pin support is supportable on main bearing supports or main bearing support extensions in the nacelle.

\* \* \* \* \*